Patented Sept. 25, 1945

2,385,704

UNITED STATES PATENT OFFICE 2,385,704

METHOD OF RECOVERING SULPHUR DIOXIDE

George W. Hooker, Stephen C. Stowe, and Lewis R. Drake, Midland, Mich., assignors to The Dow Chemical Company, Midland, Mich., a corporation of Michigan No Drawing. Application January 22, 1942, Serial No. 427,778

14 Claims. (Cl. 23—178)

This invention concerns an improved method for recovering sulphur dioxide from mixtures containing the same. It also concerns certain new and superior organic extractants for sulphur dioxide which may be employed in the method.

In our co-pending application, Serial No. 290,864, filed August 18, 1939, of which the present application is a continuation-in-part, we have disclosed that organic sulphones, when liquefied, have an exceptionally high absorptive capacity for sulphur dioxide and only a relatively small solvent action for most hydrocarbons, halohydrocarbons, or gases such as nitrogen, oxygen, etc., and that the liquefied sulphones, particularly the sulphones of conjugated diolefines such as butadiene-1.3 or isoprene, may advantageously be used to extract sulphur dioxide from liquid or gaseous mixtures of the same with air or with organic compounds such as saturated or unsaturated hydrocarbons or corresponding halohydrocarbons, etc. The use of a liquefied sulphone instead of water for such extraction of sulphur dioxide is advantageous in a number of respects, e. g. it permits recovery of the sulphur dioxide in purified and anhydrous form and avoids the drying operations which are required when water is used as the extractant and it avoids the formation of sulphurous acid or of other products which are corrosive to metals, and thereby permits carrying out of the extraction in usual iron or steel equipment. Furthermore, since the absorptive capacity of the liquefied sulphones for sulphur dioxide is far higher than that of water, the use of a sulphone instead of water as the extractant results in a decrease in the size of extraction equipment required for a given productive capacity. Also, the heat required to vaporize and recover sulphur dioxide from its solution in the sulphone is considerably less than that required to vaporize an equal amount of sulphur dioxide from an aqueous sulphur dioxide solution.

However, the sulphones of conjugated diolefines, which are the preferred sulphur dioxide extractants in said co-pending application, Serial No. 290,864, possess certain undesirable properties which limit their utility as extractants for sulphur dioxide. They are in most instances solid or crystalline compounds at room temperature, e. g. the sulphones of butadiene and isoprene have melting points of 65° and 64° C., respectively, and must either be employed at temperatures above their melting points or must be treated with freezing point depressants, since the solid sulphones have little or no absorptive capacity for sulphur dioxide. Also, they decompose at undesirably low temperatures, e. g. the sulphones of butadiene and isoprene decompose at about 120° C.; hence, in vaporizing absorbed sulphur dioxide therefrom, care must be taken to avoid overheating if pure sulphur dioxide is to be obtained.

We have now found that tetrahydrothiophene-1.1-dioxide and certain nuclear substituted alkyl and alkoxy derivatives thereof, which compounds have the general formula:

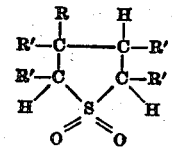

wherein R represents hydrogen or a lower alkoxy radical, each R' represents hydrogen or a lower alkyl radical, and there are less than three alkyl radicals attached to the nucleus, have lower melting points and higher decomposition temperatures than the corresponding sulphones of diolefines and that when in liquid form they also have a high absorptive capacity for sulphur dioxide and relatively little solvent action for oxygen, nitrogen, aliphatic hydrocarbons, chloroaliphatic hydrocarbons, or for the other ingredients which in industrial manufacturing processes are often obtained in admixture with sulphur dioxide. For convenience, the compounds having the general formula just given are hereinafter referred to generically as "hydrothiophene dioxides." In most instances the hydrothiophene dioxides are liquid at room temperature or only slightly above and are stable against thermal decomposition or oxidation by air at temperatures above 200° C. They may be employed in undiluted form as extractants for sulphur dioxide at lower temperatures than may the sulphones of diolefines and they may thereafter be heated without decomposition or oxidation by air to temperatures sufficient for substantially complete vaporization of the absorbed sulphur dioxide therefrom. In general, the hydrothiophene dioxides are capable of absorbing more than 2.5 times as great a proportion by weight of sulphur dioxide as may be absorbed in water by using the latter, instead of the hydrothiophene sulphone, as the extractant under otherwise similar conditions.

The hydrothiophene dioxides may be prepared in known manner from the sulphones of conjugated diolefines by reacting the latter with hydrogen or a lower aliphatic alcohol. For instance, tetrahydrothiophene-1.1-dioxide may be obtained by hydrogenating the sulphone of butadiene-1.3; 2-methyl-tetrahydrothiophene-1.1-dioxide may be prepared by hydrogenating the sulphone of piperylene; and 3-methyl-tetrahydrothiophene-1.1-dioxide may be obtained by hydrogenating the sulphone of isoprene. The procedure and conditions for carrying out such hydrogenations are given in U. S. Patent No. 2,233,999. Again, 3-methoxy-tetrahydrothiophene-1.1-dioxide may be prepared by reacting methyl alcohol with the sulphone of butadiene-1.3 in the presence of an alkali; 3-ethoxy-tetrahydrothiophene-1.1-dioxide may be obtained by similar reaction of ethyl alcohol with the sulphone of butadiene-1.3; and a methoxy- or an ethoxy-derivative of 3-methyl-tetrahydrothiophene-1.1-dioxide, containing the alkoxy substituent in the 3- or the 4-position of the nucleus, may be obtained by similar reaction of methyl or ethyl alcohol, respectively, with the sulphone of isoprene. The conditions for effecting such reaction between an alcohol and the sulphone of a conjugated diolefine are described in U. S. Patent No. 2,219,006.

Examples of other hydrothiophene dioxides which may similarly be prepared and may be employed in the present process are 3.4-dimethyl-tetrahydrothiophene-1.1-dioxide, 3 - ethyltetrahydrothiophene-1.1-dioxide, 3-butyl-tetrahydrothiophene-1.1 - dioxide, 3 - propyloxytetrahydrothiophene-1.1-dioxide, 3-isopropyloxytetrahydrothiophene-1.1-dioxide, 3-butyloxytetrahydrothiophene-1.1-dioxide, etc.

The extraction of sulphur dioxide with the hydrothiophene dioxides may be carried out in any of the ways usual with other extractants. For instance, gaseous mixtures containing sulphur dioxide may be bubbled through or treated in a scrubbing tower with the hydrothiophene dioxides to extract sulphur dioxide therefrom, leaving the other components of the mixture relatively pure. Similarly, a liquid sulphur dioxide-containing mixture may advantageously be treated in counter-flow manner with the hydrothiophene dioxide extractants. Either such extraction may be carried out at any desired pressure and at any temperature above the freezing temperature and below the decomposition point of the extractant, provided that the pressure is sufficient to permit absorption of sulphur dioxide by the hydrothiophene dioxide. The proportion of sulphur dioxide which may be absorbed by the extractant increases of course as the temperature is lowered within the limits just stated and/or the pressure is raised. The extraction may, in nearly all instances, be carried out satisfactorily at room temperature or thereabout and at atmospheric pressure, but in order to obtain a more selective absorption of sulphur dioxide from a mixture or to increase the absorptive capacity of the hydrothiophene dioxide, higher temperatures or pressures may sometimes advantageously be employed. The extraction is usually carried out at temperatures below 100° C. and at pressures of from 1 to 6 atmospheres, but other temperatures and pressures may be used.

After separating the extract from the mixture, sulphur dioxide is vaporized therefrom. This may be accomplished by raising the temperature or lowering the pressure, or both. When the extraction has been carried out at atmospheric pressure or thereabout, the absorbed sulphur dioxide is subsequently vaporized by heating the extract, e. g. to temperatures between 80° and 200° C. When the extraction has been carried out at an increased temperature and pressure, e. g. at 60°–80° C. and 3 atmospheres pressure or higher, a large part of the absorbed sulphur dioxide may be vaporized from the extract by merely releasing the pressure. The vaporized sulphur dioxide is collected in usual manner.

The following examples illustrate certain of the advantages of the invention, but are not to be construed as limiting its scope.

EXAMPLE 1

The compounds tetrahydrothiophene-1.1-dioxide, 3-methyl-tetrahydrothiophene-1.1-dioxide and 3-methoxy-tetrahydrothiophene-1.1-dioxide were prepared in known manner and the freezing point of each and also its boiling points at two different pressures were determined. The solubility of sulphur dioxide in each of said compounds, while contacting the latter with gaseous sulphur dioxide at atmospheric pressure, was also determined at each of two temperatures. The following table gives these values for each of the compounds named.

Table

| Hydrothiophene sulphone | | | Pounds SO₂ per pound of sulphone at— | |
|---|---|---|---|---|
| Kind | F. P., °C. | B. P., °C. | 20° C. | 75° C. |
| Tetrahydrothiophene-1.1-dioxide | 26 | 110 at 3 mm., 285 at 760 mm | About 0.65 | 0.115 |
| 3-methyl-tetrahydrothiophene-1.1-dioxide | −5 | 133 at 6 mm., 290 at 760 mm | 0.577 | 0.100 |
| 3 - methoxy - tetrahydrothiophene - 1.1 - dioxide | About −32 | 152 at 3 mm., 334 at 760 mm | 0.49 | 0.081 |

For purpose of comparison with the above solubility values, it may be mentioned that water in contact with gaseous sulphur dioxide at atmospheric pressure will dissolve about 0.11 pound of sulphur dioxide per pound of water at 20° C. and about 0.03 pound of sulphur dioxide per pound of water at 75° C.

EXAMPLE 2

Two experiments were carried out to determine the proportion of sulphur dioxide which could be absorbed by tetrahydrothiophene - 1.1 - dioxide from a gaseous mixture of 1 part by volume of sulphur dioxide and 1 part of aliphatic hydrocarbons (principally butylene) at atmospheric pressure and at each of the temperatures 20° C. and 75° C. The procedure was to pass the gaseous mixture through a body of the tetrahydrothiophene-1.1-dioxide, while maintaining the latter and also the gaseous mixture at the chosen temperature until the sulphur dioxide content of the gas flowing from the extraction mixture was the same as that of the gas entering said mixture. In each experiment the partial pressure of the gaseous sulphur dioxide was then, of course, 0.5 atmosphere. A sample of the tetrahydrothiophene-1.1-dioxide was withdrawn and analyzed to determine the proportion of sulphur dioxide absorbed therein. It was found that 1 pound of tetrahydrothiophene-1.1-dioxide had absorbed 0.256 pound of sulphur dioxide at 20° C. and 0.05 pound of sulphur dioxide at 75° C.

EXAMPLE 3

The experiments described in Example 2 were repeated, except that 3-methoxy-tetrahydrothiophene-1.1-dioxide, instead of tetrahydrothiophene-1.1-dioxide, was used as the sulphur dioxide extractant. The gaseous mixture employed in each experiment initially consisted of 1 part by volume of sulphur dioxide and 1 part of aliphatic hydrocarbons (principally butylene along with small proportions of ethyl-acetylene, vinyl-acetylene and possibly a trace of butane). In each experiment the vapor pressure was 1 atmosphere so that the partial pressure of sulphur dioxide at the close of the experiment was 0.5 atmosphere. It was found that one pound of the 3-methoxy-tetrahydrothiophene-1.1-dioxide absorbed 0.214 pound of sulphur dioxide from the gaseous mixture at 20° C. and 0.048 pound of sulphur dioxide at 75° C.

EXAMPLE 4

A gaseous mixture consisting of 58 per cent by volume of sulphur dioxide and 42 per cent of butylene (principally butylene-1) was passed at approximately atmospheric pressure and at a rate of 160 cubic centimeters per minute (measured at 20° C. and 750 millimeters pressure) into the mid-section of a usual vertical absorption column of 1 inch internal diameter and having a height of 4 feet. The liquid compound, 3-methoxy-tetrahydrothiophene-1.1-dioxide was at the same time fed into the top of the column at a rate of 8.9 cubic centimeters per minute, while venting unabsorbed gas from the top of the column and withdrawing the resultant solution of sulphur dioxide in 3-methoxy-tetrahydrothiophene from the bottom of the column. During these operations the mixture within the column was heated so as to maintain a fairly uniform temperature gradient which varied from 74° C. in the bottom of the column to 20° C. in the top of the column. The gas vented from the top of the column was analyzed and found to be purified butylenes containing only 2 per cent by volume of sulphur dioxide. A sample of liquor withdrawn from the bottom of the column was analyzed and found to contain 3.45 per cent by weight of absorbed sulphur dioxide. Another portion of said liquor was heated to about 100° C. to vaporize the absorbed gases therefrom and the gas given off was collected and analyzed. It was sulphur dioxide of 97 per cent purity.

Although the hydrothiophene dioxides are preferably employed in concentrated or undiluted form as extractants for sulphur dioxide, they may be used in admixture with one another or with other organic liquids such as acetone, ethyl acetate, or methyl ethyl ketone, etc., which are capable of being dissolved therewith. The liquid extractant is usually prepared so as to contain more than 50 per cent and preferably at least 90 per cent by weight of hydrothiophene dioxide.

Other modes of applying the principle of the invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. In a method wherein sulphur dioxide is separated by extraction from a mixture comprising the same, the step of contacting the mixture with a liquid extractant consisting essentially of a hydrothiophene dioxide having the general formula:

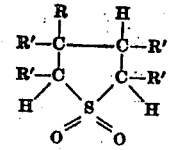

wherein R represents a member of the group consisting of hydrogen and lower alkoxy radicals, each R' represents a member of the group consisting of hydrogen and lower alkyl radicals, and there are less than 3 alkyl radicals attached to the nucleus, whereby the hydrothiophene-dioxide extracts sulphur dioxide from said mixture.

2. In a method wherein sulphur dioxide is separated by extraction from a mixture comprising the same, the steps of contacting the mixture with a liquid extractant consisting essentially of a hydrothiophene-dioxide having the general formula:

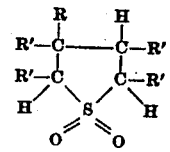

wherein R represents a member of the group consisting of hydrogen and lower alkoxy radicals, each R' represents a member of the group consisting of hydrogen and lower alkyl radicals, and there are less than 3 alkyl radicals attached to the nucleus, whereby said extractant extracts sulphur dioxide from the mixture and forms an extract containing not less than 2.5 times as great a proportion by weight of sulphur dioxide as that in the extract obtainable by using water as the extractant under otherwise similar conditions, and thereafter recovering sulphur dioxide from the extract.

3. In a method for separating sulphur dioxide from a mixture comprising the same and an aliphatic hydrocarbon, the steps which consist in contacting said mixture with a liquid extractant consisting essentially of a hydrothiophene-dioxide having the general formula:

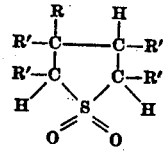

wherein R represents a member of the group consisting of hydrogen and lower alkoxy radicals, each R' represents a member of the group consisting of hydrogen and lower alkyl radicals, and there are less than 3 alkyl radicals attached to the nucleus, whereby sulphur dioxide is extracted from said mixture by the liquid extractant, and thereafter recovering sulphur dioxide from the extract.

4. In a method for separating sulphur dioxide from a mixture comprising the same and butylene as the major ingredients, the steps which consist in contacting said mixture with a liquid extractant consisting essentially of a hydrothiophene dioxide having the general formula:

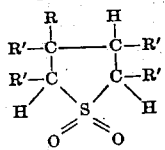

wherein R represents a member of the group consisting of hydrogen and lower alkoxy radicals, each R' represents a member of the group consisting of hydrogen and lower alkyl radicals, and there are less than 3 alkyl radicals attached to the nucleus, whereby sulphur dioxide is extracted from said mixture by the liquid extractant, and thereafter recovering sulphur dioxide from the extract.

5. In a method for separating sulphur dioxide from a mixture comprising the same and butadiene as the major ingredients, the steps which consist in contacting said mixture with a liquid extractant consisting essentially of a hydrothiophene dioxide having the general formula:

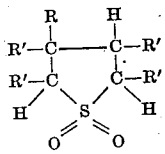

wherein R represents a member of the group consisting of hydrogen and lower alkoxy radicals, each R' represents a member of the group consisting of hydrogen and lower alkyl radicals, and there are less than 3 alkyl radicals attached to the nucleus, whereby sulphur dioxide is extracted from said mixture by the liquid extractant, and thereafter recovering sulphur dioxide from the extract.

6. In a method wherein sulphur dioxide is separated by extraction from a mixture comprising the same, the steps which consist in contacting the mixture with a liquid extractant consisting essentially of tetrahydrothiophene-1.1-dioxide, whereby sulphur dioxide is extracted from said mixture by the liquid extractant, and thereafter recovering sulphur dioxide from the extract.

7. In a method for separating sulphur dioxide from a mixture comprising the same and butylene as the major ingredients, the steps which consist in contacting the mixture with a liquid extractant consisting essentially of tetrahydrothiophene-1.1-dioxide, whereby sulphur dioxide is extracted from said mixture by the liquid extractant, and thereafter recovering sulphur dioxide from the extract.

8. In a method for separating sulphur dioxide from a mixture comprising the same and butadiene as the major ingredients, the steps which consist in contacting the mixture with a liquid extractant consisting essentially of tetrahydrothiophene-1.1-dioxide, whereby sulphur dioxide is extracted from said mixture by the liquid extractant, and thereafter recovering sulphur dioxide from the extract.

9. In a method wherein sulphur dioxide is separated by extraction from a mixture comprising the same, the steps which consist in contacting the mixture with a liquid extractant consisting essentially of 3-methoxy-tetrahydrothiophene-1.1-dioxide, whereby sulphur dioxide is extracted from said mixture by the liquid extractant, and thereafter recovering sulphur dioxide from the extract.

10. In a method for separating sulphur dioxide from a mixture comprising the same and butylene as the major ingredients, the steps which consist in contacting the mixture with a liquid extractant consisting essentially of 3-methoxy-tetrahydrothiophene-1.1-dioxide, whereby sulphur dioxide is extracted from said mixture by the liquid extractant, and thereafter recovering sulphur dioxide from the extract.

11. In a method for separating sulphur dioxide from a mixture comprising the same and butadiene as the major ingredients, the steps which consist in contacting the mixture with a liquid extractant consisting essentially of 3-methoxy-tetrahydrothiophene-1.1-dioxide, whereby sulphur dioxide is extracted from said mixture by the liquid extractant, and thereafter recovering sulphur dioxide from the extract.

12. In a method wherein sulphur dioxide is separated by extraction from a mixture comprising the same, the steps which consist in contacting the mixture with a liquid extractant consisting essentially of 3-methyl-tetrahydrothiophene-1.1-dioxide, whereby sulphur dioxide is extracted from said mixture by the liquid extractant, and thereafter recovering sulphur dioxide from the extract.

13. In a method for separating sulphur dioxide from a mixture comprising the same and butylene as the major ingredients, the steps which consist in contacting the mixture with a liquid extractant consisting essentially of 3-methyl-tetrahydrothiophene-1.1-dioxide, whereby sulphur dioxide is extracted from said mixture by the liquid extractant, and thereafter recovering sulphur dioxide from the extract.

14. In a method for separating sulphur dioxide from a mixture comprising the same and butadiene as the major ingredients, the steps which consist in contacting the mixture with a liquid extractant consisting essentially of 3-methyl-tetrahydrothiophene-1.1-dioxide, whereby sulphur dioxide is extracted from said mixture by the liquid extractant, and thereafter recovering sulphur dioxide from the extract.

GEORGE W. HOOKER.
STEPHEN C. STOWE.
LEWIS R. DRAKE.